United States Patent
Schönlein

(10) Patent No.: US 12,202,772 B2
(45) Date of Patent: Jan. 21, 2025

(54) CHEMICAL FASTENING METHOD WITH AN INORGANIC MORTAR SYSTEM HAVING ALUMINOUS CEMENT AND HARD AGGREGATE WITH MOHS-HARDNESS GREATER THAN OR EQUAL TO 8

(71) Applicant: Hilti Aktiengesellschaft, Schaan (LI)

(72) Inventor: Markus Schönlein, Gilching (DE)

(73) Assignee: Hilti Aktiengesellschaft, Schaan (LI)

( * ) Notice: Subject to any disclaimer, the term of this patent is extended or adjusted under 35 U.S.C. 154(b) by 155 days.

(21) Appl. No.: 17/759,166

(22) PCT Filed: Jan. 14, 2021

(86) PCT No.: PCT/EP2021/050658
§ 371 (c)(1),
(2) Date: Jul. 20, 2022

(87) PCT Pub. No.: WO2021/148299
PCT Pub. Date: Jul. 29, 2021

(65) Prior Publication Data
US 2023/0059102 A1    Feb. 23, 2023

(30) Foreign Application Priority Data
Jan. 22, 2020   (EP) ..................... 20153058

(51) Int. Cl.
*E21D 20/02*   (2006.01)
*C04B 14/28*   (2006.01)
*C04B 14/30*   (2006.01)
*C04B 22/06*   (2006.01)
*C04B 22/14*   (2006.01)
*C04B 22/16*   (2006.01)
*C04B 24/06*   (2006.01)
*C04B 28/06*   (2006.01)
*C04B 103/10*   (2006.01)
*C04B 103/20*   (2006.01)
*C04B 103/32*   (2006.01)
*C04B 111/00*   (2006.01)

(52) U.S. Cl.
CPC .............. *C04B 28/06* (2013.01); *C04B 14/28* (2013.01); *C04B 14/303* (2013.01); *C04B 22/062* (2013.01); *C04B 22/147* (2013.01); *C04B 22/165* (2013.01); *C04B 24/06* (2013.01); *E21D 20/023* (2013.01); C04B 2103/10 (2013.01); C04B 2103/20 (2013.01); C04B 2103/32 (2013.01); C04B 2111/00715 (2013.01)

(58) Field of Classification Search
CPC ... E21D 20/021; E21D 20/023; F16B 13/142; F16B 13/145; C04B 14/022; C04B 14/04; C04B 14/046; C04B 14/28; C04B 14/303; C04B 14/306; C04B 14/307; C04B 14/321; C04B 14/322; C04B 14/323; C04B 14/324; C04B 14/327; C04B 14/328; C04B 22/0013; C04B 22/0093; C04B 22/062; C04B 22/147; C04B 22/16; C04B 22/165; C04B 24/003; C04B 24/06; C04B 28/06; C04B 40/065; C04B 2103/0043; C04B 2103/0046; C04B 2103/10; C04B 2103/20; C04B 2103/30; C04B 2103/32; C04B 2111/00715

See application file for complete search history.

(56) References Cited

U.S. PATENT DOCUMENTS

| | | | |
|---|---|---|---|
| 5,256,723 A * | 10/1993 | Hense | ................... C08F 220/16 |
| | | | 525/445 |
| 6,583,259 B1 * | 6/2003 | Weber | ........................ C09J 4/00 |
| | | | 206/568 |
| 11,214,518 B2 | 1/2022 | Pfeil et al. | |

(Continued)

FOREIGN PATENT DOCUMENTS

| | | |
|---|---|---|
| CN | 108137423 | 6/2018 |
| DE | 102011055883 | 6/2013 |

(Continued)

OTHER PUBLICATIONS

International Search Report dated Mar. 26, 2021, in PCT/EP2021/050658, 4 pages.

(Continued)

*Primary Examiner* — Frederick L Lagman
*Assistant Examiner* — Stacy N Lawson
(74) *Attorney, Agent, or Firm* — Grüneberg and Myers PLLC

(57) ABSTRACT

An inorganic mortar system for chemical fastening of an anchor in mineral substrates can contain at least one hard aggregate having a Mohs-hardness of greater than or equal to 8. The inorganic mortar system contains a curable aluminous cement component A and an initiator component B for initiating the curing process. Component A contains at least one blocking agent selected from boric acid, phosphoric acid, metaphosphoric acid, phosphorous acid, phosphoric acid, and salts and mixtures thereof. Component B contains an initiator, at least one retarder, at least one mineral filler, and water. The use of at least one hard aggregate having a Mohs-hardness of greater than or equal to 8 in an inorganic mortar increases load values and reduces shrinkage. A method can be used for chemical fastening of an anchor, preferably of metal elements, in mineral substrates, such as structures made of brickwork, concrete, pervious concrete, or natural stone.

17 Claims, No Drawings

(56) References Cited

U.S. PATENT DOCUMENTS

| | | |
|---|---|---|
| 11,214,519 B2 | 1/2022 | Falger et al. |
| 2010/0175589 A1 | 7/2010 | Charpentier et al. |
| 2014/0343194 A1 | 11/2014 | Taquet et al. |
| 2018/0251404 A1* | 9/2018 | Pfeil ...................... C04B 28/06 |
| 2018/0282217 A1 | 10/2018 | Falger et al. |
| 2018/0290935 A1* | 10/2018 | Pfeil ..................... E04B 1/4157 |
| 2019/0071353 A1 | 3/2019 | Pfeil et al. |
| 2020/0024202 A1* | 1/2020 | Sharmak ............... C04B 28/065 |
| 2020/0377424 A1* | 12/2020 | Sharmak ............... E21D 20/021 |
| 2022/0098107 A1 | 3/2022 | Falger et al. |

FOREIGN PATENT DOCUMENTS

| | | |
|---|---|---|
| JP | 2018-534228 | 11/2018 |
| JP | 2019-500297 | 1/2019 |
| WO | 2020/002070 | 1/2020 |

OTHER PUBLICATIONS

Written Opinion dated Mar. 26, 2021, in PCT/EP2021/050658, 6 pages.

* cited by examiner

CHEMICAL FASTENING METHOD WITH AN INORGANIC MORTAR SYSTEM HAVING ALUMINOUS CEMENT AND HARD AGGREGATE WITH MOHS-HARDNESS GREATER THAN OR EQUAL TO 8

CROSS-REFERENCE TO RELATED APPLICATIONS

This application is the National Stage entry under § 371 of International Application No. PCT/EP2021/050658, filed on Jan. 14, 2021, and which claims the benefit of priority to European Application No. 20153058.1, filed on Jan. 22, 2020. The content of each of these applications is hereby incorporated by reference in its entirety.

BACKGROUND OF THE INVENTION

Field of the Invention

The present invention pertains to a use of at least one hard aggregate having a Mohs-hardness of greater than or equal to 8 in an inorganic mortar system for a chemical fastening of anchoring means in mineral substrates, comprising a curable aluminous cement component A and an initiator component B for initiating the curing process, component A further comprising at least one blocking agent selected from the group consisting of boric acid, phosphoric acid, metaphosphoric acid, phosphorous acid, phosphonic acids, salts and mixtures thereof, and component B comprising an initiator, at least one retarder, at least one mineral filler and water. In particular, the present invention pertains to the use of at least one hard aggregate having a Mohs-hardness of greater than or equal to 8 in an inorganic mortar system for a chemical fastening of anchoring means in mineral substrates to increase load values. Moreover, the present invention pertains to a method for a chemical fastening of anchoring means, preferably of metal elements, in mineral substrates, such as structures made of brickwork, concrete, pervious concrete or natural stone.

Description of Related Art

Many mortar systems exist which provide a good chemical fastening of anchoring means in mineral substrates. For example, organic systems based on free-radically polymerizable resins are used when fast curing is desired. However, such systems are generally known to be polluting, expensive, potentially hazardous and/or toxic for the environment and for the person who handles them and they often need to be specifically labeled. Moreover, organic systems often show a much reduced stability when thermally exposed to strong sunlight or otherwise elevated temperatures, such as fire, thereby decreasing their mechanical performance when it comes to chemical fastening of anchoring means.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is more resistant to acids and attains its maximum strength more rapidly than Portland cement and is capable of withstanding solutions of sulfates. Hence, aluminous cement systems are preferably employed in the field of chemical anchoring.

When it comes to chemical fastening of anchoring means in mineral substrates, most of the known systems lack sufficient fluidity for most practical applications of the resultant compositions. Often such prior art compositions also evidence a tendency to crack in a relatively short time or do not exhibit the required mechanical performance, in particular under certain conditions such as under the influence of elevated temperatures, in diamond-drilled boreholes, or in wet boreholes as well as over a long period of time. Moreover, known systems tend to exhibit a large extend of shrinkage when applied in a borehole which results in an insufficient anchoring of the anchoring means.

Therefore, there is a need for an inorganic mortar system, preferably a two-component inorganic mortar system, which is superior over the prior art systems. In particular, it is of interest to provide a system that can be used for a chemical fastening of anchoring means in mineral substrates without adversely affecting the handling, characteristics and the mechanical performance of the chemical anchoring system, especially when applied in diamond-drilled boreholes, in wet boreholes and over a long period of time. Especially, there is a need for a system that provides increased load values when compared to the known systems. In addition, there is a long felt need to compensate shrinkage of the mortar in the borehole at the same time to secure anchoring of the anchoring means, such as anchor rods, threaded anchor rods, bolts or steel reinforcement bars.

SUMMARY OF THE INVENTION

In view of the above, it is an object of the present invention to provide an inorganic mortar system, preferably a multiple-component mortar system, in particular a two-component inorganic mortar system, which has an excellent mechanical performance, in particular under certain conditions such as in diamond-drilled boreholes, in wet boreholes and over a long period of time and at the same time having increased load values when compared to the known systems. Further, the inorganic mortar system should exhibit low shrinkage to guarantee secure anchoring application.

Moreover, it is an object of the present invention to provide a method for a chemical fastening of anchoring means, preferably of metal elements, in mineral substrates, such as structures made of brickwork, concrete, pervious concrete or natural stone.

These and other objectives as they will become apparent from the ensuring description of the invention are solved by the present invention as described below. Descriptions further below pertain to preferred embodiments.

In one aspect, the present invention pertains to a use of at least one hard aggregate having a Mohs-hardness of greater than or equal to 8 in an inorganic mortar system for a chemical fastening of anchoring means in mineral substrates, comprising a curable aluminous cement component A and an initiator component B for initiating the curing process, component A further comprising at least one blocking agent selected from the group consisting of boric acid, phosphoric acid, metaphosphoric acid, phosphorous acid, phosphonic acids, salts and mixtures thereof, and component B comprising an initiator, at least one retarder, at least one mineral filler and water to increase load values.

In another aspect, the present invention pertains to a method for a chemical fastening of anchoring means, preferably of metal elements, in mineral substrates, such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO \cdot Al_2O_3$, or CA in the cement chemist notation).

The term "initiator" in the context of the present invention refers to a compound or composition that modifies the chemical environment to start a particular chemical reaction. In the present invention the initiator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "at least one hard aggregate having a Mohs-hardness of greater than or equal to 8" refers back to the Mohs scale of mineral hardness and is based on the ability of one natural sample of mineral to scratch another mineral visibly, and includes all aggregates having a Mohs-hardness of greater than or equal to 8, such as topaz, cubic zirconia, chrysoberyl, chromium, silicon nitride, tantalum carbide, corundum, sapphire ruby, tungsten carbide, titanium nitride, silicon carbide, tungsten carbide, tantalum carbide, zirconium carbide, alumina, beryllium carbide, titanium carbide, aluminum boride, boron carbide, boron, boron nitride, rhenium diboride, stishovite, titanium diboride, diamond and carbonado.

It has been surprisingly found out by the inventors, that the addition of at least one hard aggregate having a Mohs-hardness of greater than or equal to 8 to an inorganic mortar system for a chemical fastening of anchoring means in mineral substrates, comprising a curable aluminous cement component, preferably based on calcium aluminate cement, results in a significant increase of load values when compared to a system not comprising at least one hard aggregate having a Mohs-hardness of greater than or equal to 8. It has also been found out that the addition of at least one hard aggregate having a Mohs-hardness of greater than or equal to 8 does not adversely affecting the handling, characteristics and the mechanical performance of the chemical anchoring system, especially when applied in diamond-drilled boreholes, in wet boreholes and over a long period of time.

Therefore, the present invention pertains to a use of at least one hard aggregate having a Mohs-hardness of greater than or equal to 8 in an inorganic mortar system for a chemical fastening of anchoring means in mineral substrates, comprising a curable aluminous cement component A and an initiator component B for initiating the curing process. In particular, component A further comprises at least one blocking agent selected from the group consisting of boric acid, phosphoric acid, metaphosphoric acid, phosphorous acid, phosphonic acids, salts and mixtures thereof, and component B comprises an initiator, at least one retarder, at least one mineral filler and water. Further, component A comprises at least one plasticizer and water.

Component A as used in the present invention is based on an aluminous cement (CA) or a calcium sulfoaluminate cement (CSA). The aluminous cement component which can be used in the present invention is preferably an aluminous cement component based on an aqueous-phase calcium aluminate cement (CAC). The aluminous cement to be used in the present invention is characterized by rapid set and rapid hardening, rapid drying, excellent resistance to corrosion and shrinkage. Such a calcium aluminate cement suitable to be used in the present invention is for example Ternal® White (Kerneos, France).

It has been found that if component A comprises a mixture of calcium aluminate cement (CAC) and at least one hard aggregate having a Mohs-hardness of greater than or equal to 8, an increase in load values can be achieved.

The at least one hard aggregate having a Mohs-hardness of greater than or equal to 8 used in an inorganic mortar system for a chemical fastening of anchoring means in mineral substrates according to the present invention, is preferably a mineral aggregates selected from the group consisting of topaz, cubic zirconia, chrysoberyl, chromium, silicon nitride, tantalum carbide, corundum, sapphire ruby, tungsten carbide, titanium nitride, silicon carbide, tungsten carbide, tantalum carbide, zirconium carbide, alumina, beryllium carbide, titanium carbide, aluminum boride, boron carbide, boron, boron nitride, rhenium diboride, stishovite, titanium diboride, diamond and carbonado. In a preferred embodiment of the present invention the at least one hard aggregate having a Mohs-hardness of greater than or equal to 8 is corundum, topaz or diamond. In a most preferred embodiment of the present invention the at least one hard aggregate having a Mohs-hardness of greater than or equal to 8 is corundum.

The at least one hard aggregate having a Mohs-hardness of greater than or equal to 8 used according to the present invention, is preferably comprised in the curable aluminous cement component A of the inorganic mortar system. In a preferred embodiment of the present invention, the at least one hard aggregate having a Mohs-hardness of greater than or equal to 8 is comprised in a curable aluminous cement component based on an aqueous-phase calcium aluminate cement of the inorganic mortar system.

In particular, the at least one hard aggregate having a Mohs-hardness of greater than or equal to 8 comprised in the curable aluminous cement component A is present in a weight-ratio of at least one hard aggregate having a Mohs-hardness of greater than or equal to 8 to the aqueous-phase blocked calcium aluminate cement component in a range of from 70/30 to 30/70, preferably from 60/40 to 40/60, most preferably in a weight-ratio of 50/50. In a particular preferred embodiment of the present invention, the corundum is present in the curable aluminous cement component based on an aqueous-phase calcium aluminate cement in a weight-ratio of corundum to the aqueous-phase blocked calcium aluminate cement component in a range of from 70/30 to 30/70, preferably from 60/40 to 40/60, most preferably in a ratio of 50/50.

The at least one hard aggregate having a Mohs-hardness of greater than or equal to 8 has preferably an average particle size in the range of from 0.1 to 2 mm, more preferably from 1 to 2 mm, most preferably from 1.2-1.8 mm.

In a most preferred embodiment of the present invention, the at least one hard aggregate having a Mohs-hardness of greater than or equal to 8 is corundum having a particle size in the range of from 0.1 to 2 mm, more preferably from 1 to 2 mm, most preferably from 1.2-1.8 mm and is present in a weight-ratio of corundum to the aqueous-phase blocked calcium aluminate cement component in a range of from 70/30 to 30/70, preferably from 60/40 to 40/60, most preferably in a weight-ratio of 50/50.

Component A as used in the present invention comprises at least about 40 wt.-%, preferably at least about 50 wt.-%, more preferably at least about 60 wt.-%, most preferably at least about 65 wt.-%, from about 40 wt.-% to about 95 wt.-%, preferably from about 50 wt.-% to about 90 wt.-%, more preferably from about 60 wt.-% to about 85 wt.-%, most preferably from about 65 wt.-% to about 80 wt.-% of aluminous cement, preferably calcium aluminate cement, based on the total weight of component A.

According to an alternative embodiment of the invention, component A comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 0.1 wt.-%, preferably at least about 1 wt.-%, more preferably at least about 1.5 wt.-%, most preferably at least about 2 wt.-%, from about 0.1 wt.-% to about 50 wt.-%, preferably from about 0.5 wt.-% to about 40 wt.-%, more preferably from about 1 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component mortar system of the present invention, the ratio of CaSO$_4$/CAC of component A should be less or equal to 5:95.

The blocking agent comprised in component A as used in the present invention is selected from the group consisting of boric acid, phosphoric acid, metaphosphoric acid, phosphorous acid, phosphonic acids, salts and mixtures thereof, preferably is phosphoric acid or metaphosphoric acid, most preferably is phosphoric acid, in particular an 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

Further, a plasticizer may be present in component A. The plasticizer comprised in component A as used in the present invention is selected from the group consisting of low molecular weight (LMW) polyacrylic acid polymers, superplasticizers from the family of polycondensates, superplasticizers from the family of polyphosphonate polyox and polycarbonate polyox, and superplasticizers from the polycarboxylate ether group, and mixtures thereof, for example Ethacryl™ G (Coatex, Arkema Group, France), Acumer™ 1051 (Rohm and Haas, U.K.), or Sika® ViscoCrete®-20 HE (Sika, Germany). Suitable plasticizers are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 20 wt.-%, preferably from about 0.1 wt.-% to about 15 wt.-%, more preferably from about 0.2 wt.-% to about 10 wt.-%, most preferably from about 0.3 wt.-% to about 5 wt.-% of said plasticizer, based on the total weight of component A.

In an advantageous embodiment, component A further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelco, USA), starched-derived ethers, guar-derived ethers, cellulose ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.15 wt.-%, most preferably at least about 0.2 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.25 wt.-% to about 0.7 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03 (Ashland, The Netherlands). Component A comprises at least about 0.001 wt.-%, preferably at least about 0.002 wt.-%, more preferably at least about 0.005 wt.-%, most preferably at least about 0.01 wt.-%, from about 0.001 wt.-% to about 1.5 wt.-%, preferably from about 0.002 wt.-% to about 0.1 wt.-%, more preferably from about 0.005 wt.-% to about 0.075 wt.-%, most preferably from about 0.01 wt.-% to about 0.03 wt.-% of said antibacterial or biocidal agent, based on the total weight of component A. In a preferred embodiment, component A comprises from about 0.01 wt.-% to about 0.03 wt.-% of Nuosept OB 03, based on the total weight of component A.

In an alternative embodiment, component A may further comprise at least one filler, in particular an organic or mineral filler. The filler which can be used in the present invention may be selected from the group consisting of quartz powder, preferably quartz powder having an averaged grain size (d50%) of about 16 μm, quartz sand, clay, fly ash, fumed silica, carbonate compounds, pigments, titanium oxides, light fillers, and their mixtures. Suitable mineral fillers are commercially available products. Exemplarily mentioned is quartz powder Millisil W12 or W6 (Quarzwerke GmbH, Germany). Component A comprises at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 20 wt.-% of said at least one filler, based on the total weight of component A.

The water content comprised in component A is at least about 0.1 wt.-%, preferably at least about 1 wt.-%, more preferably at least about 5 wt.-%, most preferably at least about 10 wt.-%, from about 1 wt.-% to about 50 wt.-%, preferably from about 5 wt.-% to about 40 wt.-%, more preferably from about 7.5 wt.-% to about 30 wt.-%, most preferably from about 10 wt.-% to about 25 wt.-%, based on the total weight of component A.

The presence of a plasticizer, thickening agent, filler as well as an antibacterial or biocidal agent does not change the overall inorganic nature of the cementitious component A.

Component A comprising the aluminous cement or calcium sulfoaluminate cement is present in aqueous-phase, preferably in form of a slurry or paste.

Component B as used in the present invention comprises an initiator, at least one retarder, at least one mineral filler and water. To ensure a sufficient processing time, whereby the initial-set time is at least 5 min or more, at least one retarder, which prevents premature hardening of the mortar composition, is used in a distinct concentration in addition to the initiator component.

The initiator present in component B is comprised of an activator component and an accelerator component which comprise a mixture of alkali and/or alkaline earth metal salts.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the sodium hydroxide used in component B is a 18% aqueous solution of sodium hydroxide.

Component B comprises at least about 0.01 wt.-%, preferably at least about 0.02 wt.-%, more preferably at least about 0.05 wt.-%, most preferably at least about 1 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1 wt.-% to about 25 wt.-% of said activator, based on the total weight of component B. In a particular preferred embodiment, the activator is comprised of water and lithium hydroxide or sodium hydroxide. The water content comprised in component B is at least about 1 wt.-%, preferably at least about 5 wt.-%, more preferably at least about 10 wt.-%, most preferably at least about 15 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of component B. The lithium hydroxide or sodium hydroxide content comprised in component B is at least about 0.1 wt.-%, preferably at least about 0.5 wt.-%, more preferably at least about 1.0 wt.-%, most preferably at least about 1.5 wt.-%, from about 0.1 wt.-% to about 10 wt.-%, preferably from about 0.5 wt.-% to about 7.5 wt.-%, more preferably from about 2 wt.-% to about 7 wt.-%, most preferably from about 3 wt.-% to about 5 wt.-%, based on the total weight of component B.

In an alternative embodiment, the activator may also be sodium silicate, potassium silicate, lithium silicate, modifications or mixtures thereof, such as sodium metasilicate, sodium orthosilicate or sodium pyrosilicate, more preferably sodium or potassium silicate. In one preferred embodiment the potassium silicate may be an aqueous solution of modified potassium or sodium silicate.

The accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium nitrate, calcium chloride, calcium formate or calcium phosphate, a sodium metal salt, such as sodium hydroxide, sodium sulfate, sodium carbonate, sodium nitrate, sodium chloride, sodium formate or sodium phosphate, or a lithium metal salt, such as lithium hydroxide, lithium sulfate, lithium sulfate monohydrate, lithium carbonate, lithium nitrate, lithium chloride, lithium formate or lithium phosphate, most preferably is lithium sulfate or lithium sulfate monohydrate. Component B comprises at least about 0.01 wt.-%, preferably at least about 0.05 wt.-%, more preferably at least about 0.1 wt.-%, most preferably at least about 0.2 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 0.2 wt.-% to about 10 wt.-% of said accelerator, based on the total weight of component B.

The at least one retarder comprised in component B as used in the present invention is selected from the group consisting of citric acid, tartaric acid, lactic acid, salicylic acid, gluconic acid, lignosulfonates, cellulose derivatives, organophosphates or synthetic polymers, maleic anhydride and mixtures thereof, preferably is a mixture of citric acid and tartaric acid. Component B comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

In a particular preferred embodiment of component B as used in the present invention, the ratio of citric acid/tartaric acid is 1.6/1.

The at least one mineral filler comprised in component B as used in the present invention is selected from the group consisting of limestone fillers, sand, crushed stones, gravels, pebbles, corundum and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B is most preferably a calcium carbonate or a mixture of calcium carbonates. Component B comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of component B. The at least one mineral filler is chosen to obtain a particle size complementary to that of the aluminous cement.

It is preferred that the at least one mineral filler has an average particle size of not more than 500 μm, more preferably of not more than 400 μm, most preferably not more than 350 μm.

In a particular preferred embodiment, the at least one mineral filler comprised in component B is a mixture of three different calcium carbonates, i.e. calcium carbonate fines, such as different Omyacarb® types (Omya International AG, Germany). or a mixture of different corundum fillers with calcium carbonate(s).

In a particular preferred alternative embodiment, the at least one mineral filler comprised in component B is mixture of three different quartz fillers. Most preferably, the first quartz filler is a quartz sand having an average particle size (d50%) of about 240 μm. The second quartz filler is a quartz powder having an average grain size (d50%) of about 40 μm. The third quartz filler is a quartz powder having an average grain size (d50%) of about 15 μm. In a particular preferred embodiment of component B as used in the present invention, the ratio of first quartz filler/second quartz filler/third quartz filler is 3/2/1.

In an advantageous embodiment, component B further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose,2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.3 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.3 wt.-% to about 1 wt.-% of said thickening agent, based on the total weight of component B.

The presence of a retarder and thickening agent does not change the overall inorganic nature of the cementitious component B.

Component B comprising the initiator and retarder is present in aqueous-phase, preferably in form of a slurry or paste.

It is preferred that the pH-value of component B is above 10, more preferably above 11 and most preferably is above 12, in particular in the range between 10 and 14, preferably between 11 and 13.

It is particularly preferred that the proportions of water in the two components, namely component A and component B, are chosen so that the water to aluminous cement ratio (W/CAC) or water to calcium sulfoaluminate cement (W/CSA), in the product obtained by mixing components A and B is lower than 1.5, preferably between 0.3 and 1.2, most preferably between 0.3 and 0.7. In a preferred embodiment, the ratio of water to calcium aluminate cement comprising calcium sulfate (W/(CAC+CaSO$_4$)) in the product obtained by mixing components A and B is lower than 0.4.

It is particularly preferred that the at least one hard aggregate having a Mohs-hardness of greater than or equal to 8 in the product obtained by mixing components A and B is present in the range of from about 1 wt.-% to 50 wt.-%, preferably from about 5 wt.-% to 40 wt.-%, more preferably from about 15 wt.-% to 40 wt.-%, most preferably from about 20 wt.-% to 38.5 wt.-%.

Moreover, it is particular preferred that the proportion of retarder in component B is chosen so that the citric acid/tartaric acid to aluminous cement ratio and citric acid/tartaric acid to calcium sulfoaluminate cement, in the product obtained by mixing components A and B is lower than 0.5, preferably between 0.01 and 0.4, most preferably between 0.1 and 0.3.

In a most preferred embodiment, component A comprises or consists of the following components:
  35 to 40 wt.-% of aluminous cement,
  45 to 55 wt.-% at least one hard aggregate having a Mohs-hardness of greater than or equal to 8,
  0.1 to 1.0 wt.-% of phosphoric acid,
  0.1 to 1.0 wt.-% of plasticizer,
  0.001 to 0.0.2 wt.-% of an antimicrobial or biocidal agent,
  optionally 5 to 20 wt.-% of mineral fillers, and
  7.5 to 10 wt.-% of water.

In a most preferred embodiment, component B comprises or consists of the following components:
  0.1 wt.-% to 6 wt.-% of lithium hydroxide or sodium hydroxide,
  0.1 wt.-% to 5 wt.-% of lithium sulfate or lithium sulfate monohydrate,
  0.05 wt.-% to 5 wt.-% of citric acid,
  0.05 wt.-% to 4 wt.-% of tartaric acid,
  30 wt.-% to 40 wt.-% of a first mineral filler,
  15 wt.-% to 25 wt.-% of a second mineral filler,
  10 wt.-% to 20 wt.-% of a third mineral filler,
  5 wt.-% to 15 wt.-% of a fourth mineral filler
  0.01 wt.-% to 0.5 wt.-% of a thickening agent, and
  15 wt.-% to 25 wt.-% of water.

Component A as used in the present invention may be prepared as follows: The phosphor-containing blocking agent is mixed with water, so that the pH-value of the resulting mixture is about 2. Plasticizer is added and the mixture homogenized. Aluminous cement, and optionally mineral filler are premixed and added stepwise to the mixture whilst increasing the stirring speed, so that the pH-value of the resulting mixture is about 4. Then, thickening agent and antibacterial/biocidal agent are added and mixed until complete homogenization of the mixture. Finally, the at least one hard aggregate having a Mohs-hardness of greater than or equal to 8 is added to the mixture and homogenized.

Component B as used in the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture.

Component A and B are present in aqueous phase, preferably in form of a slurry or paste. In particular, components A and B have a pasty to fluid aspect according to their respective compositions. In one preferred embodiment, component A and component B are in paste form thereby preventing sagging at the time of mixing the two components.

The weight ratio between component A and component B (A/B) is preferentially comprised between 7/1 and 1/3, preferably is 6/1. Preferably, the composition of the mixture comprises 85 wt.-% of component A and 15 wt.-% of component B. In an alternative embodiment, the composition of the mixture comprises 75 wt.-% of component A and 25 wt.-% of component B.

The inorganic mortar system, preferably the two-component inorganic mortar system, is of mineral nature, which is not affected by the presences of additional thickening agents or other agents.

It is preferred that the inorganic mortar system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component inorganic mortar system, especially the two-component inorganic mortar system, the volume ratio of cementitious component A to initiator component B is 1:1 to 7:1, preferably is 3:1. In an alternative embodiment, the volume ratio of cementitious component A to initiator component B is 1:3 to 1:2.

After being produced separately, component A and component B may be introduced into separate containers, from which they are ejected by means of mechanical devices and are guided through a mixing device. The inorganic mortar system is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

The hardening aluminous cement composition existing from the static mixer is inserted directly into the borehole, which is required accordingly for fastening the anchoring means, and has been initially introduced into the mineral substrate, during the chemical fastening of anchoring means, whereupon the construction element to be fastened, for example an anchor rod, is inserted and adjusted, whereupon the mortar composition sets and hardens. In particular, the inorganic mortar system is to be considered as a chemical anchor for fastening metal elements.

In a particular preferred embodiment, the inorganic mortar system for a chemical fastening of anchoring means includes two foil bags for separating curable component A and initiator component B. The two-component inorganic mortar system may alternatively be made of glass or paper.

The inorganic mortar system for a chemical fastening of anchoring means can also be referred to as capsule-in-capsule, foil-in-foil or glass-in-glass. The contents of the capsule are mixed together by inserting the inorganic mortar system into the borehole, introducing the anchoring device thereby destroying the capsule and mixing component A and B directly within the borehole ready for setting and chemically fastening the anchoring means.

Without being bound by theory, the blocking agent present in component A inhibits the solubilization of the calcium aluminate(s) in water, thereby stopping cement hydration which leads to the curing of the mixture. Upon adding the initiator component B, the pH-value is changed and the cementitious component A is unblocked and hydration reaction of the calcium aluminate(s) is released. As this hydration reaction is catalyzed and accelerated by the presence of alkali metals salts, in particular lithium salts, it has an initial set-time of shorter than 5 min. In order to retard the fast curing time (initial-set time), it is preferred that the at least one retarder comprised in component B as used in the present invention is so chosen to obtain an initial set-time of at least 5 min.

The role of mineral fillers, in particular in component B, is to adjust the final performance with regard to mechanical strength and performance as well as long term durability. By optimizing the fillers, it is possible to optimize the water/aluminous cement ratio which allows for an efficient and fast hydration of the aluminous cement.

The inorganic mortar system comprising the at least one hard aggregate having a Mohs-hardness of greater than or equal to 8 can be used for a chemical fastening of anchoring means, preferably of metal elements, such as anchor rods, in particular threaded rods, bolts, steel reinforcement bars or the like into mineral substrates, such as structures made of brickwork, concrete, pervious concrete or natural stone. In particular, the inorganic mortar system can be used for a chemical fastening of anchoring means, such as metal elements, in boreholes. It has been found out, that the use of at least one hard aggregate having a Mohs-hardness of greater than or equal to 8 in such an inorganic mortar system significantly increases the load values and hence load capacity, particular in wet boreholes as well as in diamond drilled boreholes.

Hence, the use of at least one hard aggregate having a Mohs-hardness of greater than or equal to 8 in an inorganic mortar system according to the present invention is particular to increase load values. Additionally, it is used to reduce shrinkage within the borehole.

The at least one hard aggregate having a Mohs-hardness of greater than or equal to 8 comprised in the inorganic mortar is particularly applied in a method for a chemical fastening of anchoring means, preferably of metal elements, in mineral substrates, such as structures made of brickwork, concrete, pervious concrete or natural stone.

Moreover, the inorganic mortar system comprising the at least one hard aggregate having a Mohs-hardness of greater than or equal to 8 may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchoring means, preferably metal elements, such as anchor rods, in particular threaded rods, bolts, steel reinforcement bars or the like into recesses, such as boreholes, in mineral substrates, such as structures made of brickwork, concrete, pervious concrete or natural stone, whereby the components of the two-component inorganic mortar system are prior mixed, for example by means of a static mixer or by destroying a cartridge or a plastic bag, or by mixing components of a multi-chamber pails or sets of buckets.

The following example illustrates the invention without thereby limiting it.

EXAMPLES

1. Preparation of Component A and Component B

The liquid slurries (cementitious compound A and initiator compound B) of the inventive examples A1-A9 were produced according to the following procedures.

1.1 Component A 19.86 g deionized water, 0.75 g of 85% phosphoric acid (blocking agent), 0.5 g xanthan gum (thickener), 0.6 g Ethacryl G® (superplasticizer), and 0.015 g Nuosept® (biocide) were homogenized at room temperature, and whilst stirring with a dissolver, the calcium aluminate cement (pure Ternal White®) is added in subsequent small portions, to obtain finally a smooth, liquid pasty slurry of the blocked cement in water, the pH value being below 7.

The liquid slurry was then admixed with at least one hard aggregate having a Mohs-hardness of greater than or equal to 8, e.g. corundum (Alodur RBT9, Imerys Fused Minerals, or Normal-corundum NK F030, Wester Mineralien GmbH) or with the comparative aggregate having a Mohs-hardness of less than 8, e.g. quartz (quartz sand P 1.2-1.75, Busch Quarz GmbH). The Alodur RBT9 consists of a particle range from 1 to 2 mm, with a mean particle size of ~1.4 mm. Normalkorund F030 has a particle size of ~0.5 to 1 mm while Quarzsand P 1.2-1.75 consists of particles in the range of 1.2 to 1.75 mm. The Mohs-hardness of the corundum fillers is 9 while the quartz filler has only a hardness of 7.

The composition of the different A-components A1-9 only differs in the amount and type of the aggregate.

TABLE 1

Composition of component A.

| Sample | Filler type | Filler amount [wt.-%] | Slurry amount [wt.-%] |
|---|---|---|---|
| A1 | Alodur RBT9 | 40 | 60 |
| A2 | Alodur RBT9 | 50 | 50 |
| A3 | Alodur RBT9 | 60 | 40 |
| A4 | Normal-corundum F030 | 40 | 60 |
| A5 | Normal-corundum F030 | 50 | 50 |
| A6 | Normal-corundum F030 | 60 | 40 |
| A7 | Quartz sand P | 40 | 60 |
| A8 | Quartz sand P | 50 | 50 |
| A9 | Quartz sand P | 60 | 40 |

1.2. Component B

In 18.2 g of deionized water, 1.93 g of citric acid and 1.2 g of tartaric acid (retarder), 0.65 g of Ecodis® P50 (superplasticizer), and 0.4 g Optigel® WX (thickener), 0.43 g $Li_2SO_4$ (accelerator) and 4.0 g NaOH (activator) were dissolved. Whilst stirring with a dissolver, 72.94 g of a mixture of the following calcium carbonate fillers was added in subsequent portions: 34.84 g Omyacarb® 130 AL, 17.25 g Omyacarb® 15H AL, 9.0 g Omyacarb® 2 AL and 11.85 g of Omyabrite 1300 X-OM, to obtain finally a smooth, liquid pasty slurry of the calcites in water, the pH being above 12.

2. Preparation of the Two-Component Inorganic Mortar System

After the preparation, the liquid initiator component B was filled into an inner foil bag and the cementitious pasty component A was filled into an outer foil bag comprising the sealed (welded) inner foil bag. The ratio of the liquid B component to the liquid A component without addition of the aggregate was kept 1:3 in all samples. After filling the component A into the outer foil bag, the foil bag was welded. 5 foil bags of each formulation were prepared. The amounts of the different components in the inner and outer foil bags are displayed in Table 2.

TABLE 2

Amounts of B- and A-components contained in the inner and outer foil bag, respectively

| | Weight of B-component in inner foil bag [g] | Weight of A-component in outer foil bag [g] |
|---|---|---|
| A1.1 | 4.29 | 21.45 |
| A1.2 | 4.17 | 20.83 |
| A1.3 | 4.10 | 20.48 |
| A1.4 | 4.13 | 20.67 |
| A1.5 | 4.01 | 20.37 |
| A2.1 | 4.08 | 20.37 |
| A2.2 | 4.26 | 25.57 |
| A2.3 | 4.00 | 24.01 |
| A2.4 | 4.18 | 25.08 |
| A2.5 | 4.28 | 25.68 |
| A3.1 | 3.95 | 23.67 |
| A3.2 | 4.37 | 32.71 |
| A3.3 | 4.42 | 33.13 |
| A3.4 | 4.65 | 32.83 |
| A3.5 | 4.21 | 31.54 |
| A4.1 | 4.35 | 22.67 |
| A4.2 | 4.53 | 22.70 |
| A4.3 | 4.62 | 23.74 |
| A4.4 | 4.42 | 22.26 |
| A4.5 | 4.48 | 22.73 |
| A5.1 | 4.50 | 26.98 |
| A5.2 | 4.26 | 25.56 |
| A5.3 | 4.61 | 27.79 |
| A5.4 | 4.93 | 29.06 |
| A5.5 | 4.26 | 25.83 |
| A6.1 | 4.41 | 33.06 |
| A6.2 | 4.35 | 32.58 |
| A6.3 | 4.42 | 33.10 |
| A6.4 | 4.42 | 33.01 |
| A6.5 | 4.44 | 33.27 |
| A7.1 | 4.53 | 22.71 |
| A7.2 | 4.58 | 22.87 |
| A7.3 | 4.60 | 23.10 |
| A7.4 | 4.60 | 23.00 |
| A7.5 | 4.52 | 22.78 |
| A8.1 | 4.44 | 26.25 |
| A8.2 | 4.15 | 24.99 |
| A8.3 | 4.07 | 24.48 |
| A8.4 | 4.45 | 26.29 |
| A8.5 | 4.25 | 25.53 |
| A9.1 | 3.69 | 27.01 |
| A9.2 | 3.71 | 26.52 |
| A9.3 | 3.72 | 27.32 |
| A9.4 | 3.69 | 26.89 |
| A9.5 | 3.49 | 25.82 |

3. Determination of the Mechanical Performance

The prepared foil bags were inserted into boreholes exhibiting a depth of 120 mm and a diameter of 14 mm. The boreholes were cleaned by compressed air cleaning right after drilling. Then, a threaded rod suitable for capsule anchors was drilled into the borehole comprising the foil bag until the setting depth of 120 mm was reached. The load values were measured after 24 h of curing. The results from the pull-out tests, which is a mean value of the 5 samples (Table 2) pulled from each charge, are given in Table 3.

TABLE 3

Pull-out values in N/mm² of formulations comprising different types
and amounts of fillers having different hardness after 24 h curing.

| Pull-out test | A1 | A2 | A3 | A4 | A5 | A6 | A7 comparative | A8 comparative | A9 comparative |
|---|---|---|---|---|---|---|---|---|---|
| N/mm² | 12.1 | 21.5 | 17.4 | 17.3 | 15.3 | 14.3 | 9.2 | 4.0 | 7.5 |

As can be seen from Table 3, all inventive systems comprising at least one hard aggregate having a Mohs-hardness of greater than or equal to 8, in this case corundum, show considerable higher load values after 24 hours of curing in comparison to the comparative system with quartz having a Mohs-hardness of 7 as aggregate. Especially the corundum Alodur RBT9 with a particle size of 1-2 mm with the majority (>70%) of particles being bigger than 1.4 mm shows very high values and low scattering. Most preferable is a mixture of 50%-60% corundum Alodur RBT9 in component A.

As it can be seen from Table 4, almost all inventive systems show considerable bond strengths after 24 hours of curing as well as increased load values and hence, improved mechanical strength when it comes to a chemical fastening of anchoring means, in comparison to the comparative system does not comprising any hard aggregate having a Mohs-hardness of greater than or equal to 8.

As it has been shown above, the use of at least one hard aggregate having a Mohs-hardness of greater than or equal to 8, provides for an increase in load values and hence mechanical strength when compared to systems not comprising any hard aggregate having a Mohs-hardness of greater than or equal to 8.

The invention claimed is:

1. A chemical fastening method, comprising:
   fastening an anchor in a mineral substrate with an inorganic mortar system,
   wherein the inorganic mortar system comprises at least one hard aggregate having a Mohs-hardness of greater than or equal to 8, a curable aluminous cement component A, and an initiator component B for initiating a curing process,
   the curable aluminous cement component A comprises at least one blocking agent selected from the group consisting of boric acid, phosphoric acid, metaphosphoric acid, phosphorous acid, a phosphonic acid, a salt thereof, and a mixture thereof,
   the initiator component B comprises an initiator, at least one retarder, at least one mineral filler, and water, and
   a weight ratio of said at least one hard aggregate to aqueous-phase blocked calcium aluminate cement component in component A is 70/30 to 30/70.

2. The method according to claim 1, wherein the curable aluminous cement component A further comprises at least one plasticizer and water.

3. The method according to claim 1, wherein the curable aluminous cement component A is an aluminous cement component based on an aqueous-phase calcium aluminate cement.

4. The method according to claim 1, wherein the at least one hard aggregate having a Mohs-hardness of greater than or equal to 8 is at least one selected from the group consisting of topaz, cubic zirconia, chrysoberyl, chromium, silicon nitride, tantalum carbide, corundum, sapphire ruby, tungsten carbide, titanium nitride, silicon carbide, tungsten carbide, tantalum carbide, zirconium carbide, alumina, beryllium carbide, titanium carbide, aluminum boride, boron carbide, boron, boron nitride, rhenium diboride, stishovite, titanium diboride, diamond, and carbonado.

5. The method according to claim 4, wherein the at least one hard aggregate having a Mohs-hardness of greater than or equal to 8 is at least one selected from the group consisting of topaz, corundum, and diamond.

6. The method according to claim 4, wherein the at least one hard aggregate having a Mohs-hardness of greater than or equal to 8 is corundum.

7. The method according to claim 1, wherein the at least one hard aggregate having a Mohs-hardness of greater than or equal to 8 is comprised in the curable aluminous cement component A of the inorganic mortar system.

8. The method according to claim 1, wherein the initiator comprises a mixture of alkali and/or alkaline earth metal salts,
   wherein the at least one retarder is at least one selected from the group consisting of citric acid, tartaric acid, lactic acid, salicylic acid, gluconic acid, a lignosulfonate, a cellulose derivative, an organophosphate, a synthetic polymer, maleic anhydride, and a mixture thereof, and
   wherein the at least one mineral filler is at least one selected from the group consisting of a limestone filler, sand, corundum, dolomite, alkaline-resistant glass, crushed stone, gravel, pebbles, and a mixture thereof.

9. The method according to claim 1, wherein the initiator comprises a mixture of sodium metal salts.

10. The method according to claim 1, wherein the at least one hard aggregate having a Mohs-hardness of greater than or equal to 8 is present in the inorganic mortar system in a range of from about 25 wt.-% to 50.0 wt.-%.

11. The method according to claim 1, wherein the anchor is an anchor rod, a threaded anchor rod, a bolt, or a steel reinforcement bar.

12. The method according to claim 1, wherein the mineral substrate is a structure made of brickwork, concrete, pervious concrete, or natural stone.

13. The method according to claim 1, wherein the mineral substrate comprises a borehole.

14. The method according to claim 1, wherein the anchor is a metal element.

15. The method according to claim 1, wherein the inorganic mortar system is a two-component inorganic capsule anchoring system.

16. The method according to claim 15, wherein the two-component inorganic capsule anchoring system is in a form of a film bag or in a form of a glass capsule.

17. The method according to claim 1, wherein component A comprises:
   at least about 40 wt. % of an aluminous cement or a calcium sulfoaluminate cement;
   said at least one hard aggregate having a Mohs-hardness of greater than or equal to 8;
   at least about 0.1 wt. % of said blocking agent;
   at least about 0.1 wt. % of water; and optionally at least one selected from a plasticizer, a thickening agent, a filler and an antibacterial/biocide agent.

\* \* \* \* \*

UNITED STATES PATENT AND TRADEMARK OFFICE
CERTIFICATE OF CORRECTION

PATENT NO. : 12,202,772 B2  
APPLICATION NO. : 17/759166  
DATED : January 21, 2025  
INVENTOR(S) : Markus Schönlein Page 1 of 1

It is certified that error appears in the above-identified patent and that said Letters Patent is hereby corrected as shown below:

On the Title Page

Column 2, Lines 8-9, in Item (57) ABSTRACT currently reads:
"phosphoric acid,"
And should read:
--phosphonic acid,--.

Signed and Sealed this
Twenty-seventh Day of May, 2025

Coke Morgan Stewart
*Acting Director of the United States Patent and Trademark Office*